United States Patent
Walach et al.

(10) Patent No.: US 11,151,407 B2
(45) Date of Patent: Oct. 19, 2021

(54) SYSTEM FOR DETECTING AN ADAPTED IMAGE

(71) Applicant: AIDOC Medical LTD, Tel Aviv (IL)

(72) Inventors: Eugene Walach, Haifa (IL); Elad Walach, New York, NY (US); Idan Bassukevitch, Giv'atayim (IL); Uri Goren Horesh, Beer Sheva (IL); Michael Braginski, Rishon LeTzion (IL)

(73) Assignee: AIDOC Medical LTD, Tel Aviv (IL)

( * ) Notice: Subject to any disclaimer, the term of this patent is extended or adjusted under 35 U.S.C. 154(b) by 0 days.

(21) Appl. No.: 16/552,208

(22) Filed: Aug. 27, 2019

(65) Prior Publication Data
US 2021/0064911 A1    Mar. 4, 2021

(51) Int. Cl.
| | |
|---|---|
| *G06K 9/00* | (2006.01) |
| *G06K 9/62* | (2006.01) |
| *G06T 7/11* | (2017.01) |
| *G06N 20/00* | (2019.01) |
| *G06N 5/04* | (2006.01) |
| *G06N 3/08* | (2006.01) |
| *G06T 7/00* | (2017.01) |

(52) U.S. Cl.
CPC ......... *G06K 9/6202* (2013.01); *G06K 9/6215* (2013.01); *G06N 3/084* (2013.01); *G06N 5/04* (2013.01); *G06N 20/00* (2019.01); *G06T 7/0014* (2013.01); *G06T 7/11* (2017.01); *G06T 2207/30016* (2013.01)

(58) Field of Classification Search
CPC .... G06K 9/6202; G06K 9/6215; G06N 20/00; G06N 5/04; G06N 3/084; G06T 7/11; G06T 7/0014; G06T 2207/30016
See application file for complete search history.

(56) References Cited

U.S. PATENT DOCUMENTS

| | | | | |
|---|---|---|---|---|
| 5,970,435 A | * | 10/1999 | Ito ..................... | G01G 19/086 |
| | | | | 702/173 |
| 10,373,047 B2 | * | 8/2019 | Higgins ................ | G06N 3/08 |

(Continued)

OTHER PUBLICATIONS

Daniel et al, ("An Adversarial Approach for Explainable AI in Intrusion Detection Systems", IEEE 2018, pp. 3237-3243), (Year: 2018).*

(Continued)

*Primary Examiner* — Amara Abdi
(74) *Attorney, Agent, or Firm* — Ziegler IP Law Group, LLC (57) ABSTRACT

A system for identifying a potential altered image includes an image analysis unit to analyse an image and output a result indicating whether the image shows a predetermined feature and a processor to obtain a first output from the image analysis unit for an image that has a plurality of pixels each having a pixel value, obtain an altered version of the image by adjusting pixel values of up to a predetermined threshold amount of pixels in the image, obtain a second output from the image analysis unit for the altered version of the image, determine whether the second output is different to the first output, and identify that the image is a potential altered image in response to determining that the second output is different to the first output.

13 Claims, 7 Drawing Sheets

(56) References Cited

U.S. PATENT DOCUMENTS

| | | | | |
|---|---|---|---|---|
| 2008/0123923 A1* | 5/2008 | Gielen | ...................... | G06T 7/73 |
| | | | | 382/131 |
| 2017/0287109 A1* | 10/2017 | Tasfi | ...................... | G06T 3/4046 |
| 2019/0392140 A1* | 12/2019 | Kawakita | .............. | G06F 21/552 |
| 2020/0410335 A1* | 12/2020 | Gu | ........................... | G06N 3/08 |

OTHER PUBLICATIONS

Seyed et al, ("DeepFool: a simple and accurate method to fool deep neural networks", 2016 IEEE Conference on Computer Vision and Pattern Recognition, pp. 2574-2582) (Year: 2016).*

"Adversarial Robustness Toolbox (ART)—Python Library for Machine Learning Security-Evasion Poisoning, Extraction, Inference—Red and Blue Teams," EEE Industrial Electronics Society, 2018, retrieved Jun. 9, 2021 from URL; https://github.com/IBM/adversarial-robustness-toolbox, 4 pages.

BBC, "AI image recognition fooled by single pixel change", Nov. 3, 2017, retrieved Jun. 9, 2021 from URL; https://www.bbc.com/news/technology-41845878, 4 pages.

Chen et al, "Detecting Backdoor attacks on Deep Neural Networks by Activation Clustering" Nov. 9, 2018, retrieved Jun. 9, 2021 from URL; https://arxiv.org/abs/1811.03728, 2 pages.

Dezfooli et al, "DeepFool: a simple and accurate method to fool deep neural networks", Jul. 4, 2016, retrieved Jun. 9, 2021 from URL; https://arxiv.org/pdf/1511.04599.pdf, 9 pages.

Marino et al "An Adversarial Approach for Explainable AI in Intrusion Detection Systems" IEEE Industrial Electronics Society, 2018, retrieved Jun. 9, 2021 from URL; http://www.people.vcu.edu/~mmanic/papers/2018/IECON18_MarinoWickManic_AdversarialApproachForExplainableAI.pdf, 7 pages.

Yirka, Bob, "Researchers suggest medical AI systems could be vulnerable to adversarial attacks" 2019 Science X Network, Mar. 22, 2019, retrieved Jun. 9, 2021 from URL; https://techxplore.com/news/2019-03-medical-ai-vulnerable-adversarial.html, 3 pages.

* cited by examiner

SYSTEM FOR DETECTING AN ADAPTED IMAGE

FIELD

The aspects of the disclosed embodiments relate to a system, apparatus and method for detecting whether a received image is an adapted version of an original image.

BACKGROUND

There is an increasing proliferation of Artificial Intelligence (AI) in various applications. Driven by recent advances in deep learning, AI is used for detection and classification of a wide variety of objects. For example, AI image classification frameworks such as Inception, AlexNet and VGGNet have been developed to classify images. In addition, large databases of annotated images, such as the ImageNet database have been developed to be used for training such AI classifiers.

Recently, concerns have been raised due to the fact that, in many cases, classification results from AI classifiers can be reversed by changing only a few pixels in the input image. In some cases, changing even a single pixel in an image of a turtle has been known to change the image classification result for some classifiers from turtle to rifle. This raises serious concerns both in terms of AI robustness and potential vulnerability to malicious fraud.

In other words, current AI systems are susceptible to "adversarial" attacks. An adversarial attack in the field of machine learning is an attempt to fool the model upon which such a system is built. In the example of image classification, an adversarial attack comprises providing an image classifier with an altered image to cause the image classifier to output an incorrect classification. Such an altered image can be considered to be an "adversarial image".

It is an aim to provide a system, apparatus and method that overcomes problems associated with conventional systems and apparatuses.

SUMMARY

In some embodiments, there is provided a method for creation of tempering proven AI systems.

According to an aspect, there is provide a system for identifying a potential altered image, the system comprising an image analysis unit to analyse an image and output a result indicating whether the image shows a predetermined feature; and a processor to obtain a first output from the image analysis unit for an image, the image comprising a plurality of pixels each having a pixel value, obtain an altered version of the image by adjusting pixel values of up to a predetermined threshold amount of pixels in the image, obtain a second output from the image analysis unit for the altered version of the image, determine whether the second output is different to the first output, and identify that the image is a potential altered image in response to determining that the second output is different to the first output.

An altered image is an image in which at least one of the pixel values of the pixels in the image has been changed compared to its original form. In other words, an altered image is an adversarial image.

The image analysis unit is arranged to perform image analysis to make a determination as to whether or not an image shows a certain predetermined feature. In other words, the image analysis unit is arranged to analyse the pixel values corresponding to pixels in the image, to determine whether the image shows the predetermined feature. For example, the image analysis unit could be arranged to determine whether an image shows a brain lesion. In some embodiments, the image analysis unit comprises a classifier, such as an AI classier. In other embodiments, the image analysis unit performs detection, or segmentation to determine whether the feature is shown.

While the image analysis unit is described as a separate unit here, practical implementations of embodiments of the invention are not limited to this. For example, it will be appreciated that in some embodiments, the functionality of the image analysis unit can be performed by the processor executing a set of stored image analysis instructions.

In some embodiments, the predetermined threshold amount of pixels is less than 1% of pixel values in the image. In other embodiments, the predetermined threshold amount of pixels is less than 0.1% of pixel values in the image. In other embodiments, the predetermined threshold amount of pixels is less than 0.01% of pixel values in the image. In some embodiments, the predetermined threshold amount of pixels is less than 100 pixels. In some embodiments, the predetermined threshold amount of pixels is less than 10 pixels.

The predetermined threshold amount of pixels is determined based on a 'perceptibility principle'. In other words, the predetermined threshold amount of pixels is determined as the largest amount of pixel values that can be changed in an image, before a user would be likely to notice that the changed image appears different to the original image.

In some embodiments, the image analysis unit comprises an artificial intelligence, AI, classifier, and the processor is configured to obtain the first output from the image analysis unit by applying the AI classifier to the image to obtain a first classification result, and to obtain the second output by applying the AI classifier to the altered image to obtain a second classification result.

In some embodiments, the image analysis unit further comprises a pixel adjustment layer comprising a plurality of weights corresponding to the plurality of pixels in the image, the weights initially being set to have no effect when applied to the plurality of pixel values, and the processor is configured to obtain the altered version of the image by adjusting up to a predetermined amount of weights corresponding to the predetermined threshold amount of pixels, and applying the plurality of weights from the pixel adjustment layer to the plurality of pixel values.

In some embodiments, the adjusting up to a predetermined amount of weights comprises performing backpropagation on the pixel adjustment layer to adjust up to a predetermined amount of weights corresponding to the predetermined threshold amount of pixels, the backpropagation being based on a target of obtaining an output from the image analysis unit which is different to the first output from the image analysis unit.

In some embodiments, the system further comprises a communication interface to receive the image; and an image storage to store a plurality of other images previously received by the system, wherein the processor is further configured to compare the image to the plurality of other images and to identify that the image is a potential altered image in response to determining that a similarity level between the image and one of the other images is above a threshold similarity level.

In some embodiments, the threshold similarity level is a predetermined percentage of pixels in the image and the one other image having equal pixel values.

In some embodiments, the threshold similarity level is higher than 95% of pixels in the image and the one other image having equal pixel values.

In some embodiments, the image is a medical scan and the processor is configured to segment the image into a plurality of tissue areas. In some embodiments, the segmentation is performed by grouping areas of pixels in the image according to their average pixel values. In other embodiments, an AI segmentation unit (i.e. a machine learned model trained to segment images into uniform areas) could be used instead.

In some embodiments, the predetermined threshold amount of pixels is a predetermined percentage of pixels in a first tissue area from among the plurality of tissue areas.

In some embodiments, the processor is configured to obtain the altered version of the image by adjusting pixel values of up to the predetermined threshold amount pixels in only one tissue area from among the plurality of tissue areas.

In some embodiments, the pixel value is a brightness value measured in Hounsfield units. However, embodiments are not limited to this and any suitable pixel values can be used instead. For example, pixel grayscale values can be used instead. In some embodiments, colour pixels can be used and the pixel value comprises a plurality of sub-pixel values (e.g. three sub-pixel values to correspond to each of the red, green and blue sub-pixels).

In some embodiments, the system further comprises an expected pixel value storage configured to store expected pixel values for the plurality of tissue areas, and the processor is configured to compare the pixel values in the plurality of tissue areas against the expected pixel values, and to identify that the image is a potential altered image in response to determining that the pixel values in the plurality of tissue areas do not correspond to the expected pixel values.

In some embodiments, the processor is configured to identify an external device as a suspicious device in response to determining that a predetermined threshold amount of potential altered images have been received from that device.

According to an aspect, there is provided a computer-implemented method for identifying a potential altered image, the method comprising: analysing an image to obtain a first output indicating whether the image shows a predetermined feature, wherein the image comprises a plurality of pixels each having a pixel value; obtaining an altered version of the image by adjusting pixel values of up to a predetermined threshold amount of pixels in the image, analysing the altered version of the image to obtain a second output from the image analysis unit for the altered version of the image, determining whether the second output is different to the first output, and identifying that the image is a potential altered image in response to determining that the second output is different to the first output.

In some embodiments, the predetermined threshold amount of pixels is less than 1% of pixel values in the image. In other embodiments, the predetermined threshold amount of pixels is less than 0.1% of pixel values in the image. In other embodiments, the predetermined threshold amount of pixels is less than 0.01% of pixel values in the image. In some embodiments, the predetermined threshold amount of pixels is less than 100 pixels. In some embodiments, the predetermined threshold amount of pixels is less than 10 pixels.

In some embodiments, the method comprises obtaining the first output by applying an AI classifier to the image to obtain a first classification result, and obtaining the second output by applying the AI classifier to the altered image to obtain a second classification result.

In some embodiments, the method comprises obtaining the altered version of the image by adjusting up to a predetermined amount of weights corresponding to a predetermined threshold amount of pixels, in a pixel adjustment layer comprising a plurality of weights corresponding to the plurality of pixels in the image, the weights initially being set to have no effect when applied to the plurality of pixel values, and applying the plurality of weights from the pixel adjustment layer to the plurality of pixel values.

In some embodiments, the adjusting up to a predetermined amount of weights comprises performing backpropagation on the pixel adjustment layer to adjust up to a predetermined amount of weights corresponding to the predetermined threshold amount of pixels, the backpropagation being based on a target of obtaining an output from the image analysis unit which is different to the first output from the image analysis unit.

In some embodiments, the method comprises receiving the image; storing a plurality of other images previously received by the system; comparing the image to the plurality of other images and identifying that the image is a potential altered image in response to determining that a similarity level between the image and one of the other images is above a threshold similarity level.

In some embodiments, the threshold similarity level is a predetermined percentage of pixels in the image and the one other image having equal pixel values.

In some embodiments, the threshold similarity level is higher than 95% of pixels in the image and the one other image having equal pixel values.

In some embodiments, the image is a medical scan and the method comprises segmenting the image into a plurality of tissue areas. In some embodiments, the segmentation is performed by grouping areas of pixels in the image according to their average pixel values. In other embodiments, an AI segmentation unit (i.e. a machine learned model trained to segment images into uniform areas) could be used instead.

In some embodiments, the predetermined threshold amount of pixels is a predetermined percentage of pixels in a first tissue area from among the plurality of tissue areas.

In some embodiments, the method comprises obtaining the altered version of the image by adjusting pixel values of up to the predetermined threshold amount pixels in only one tissue area from among the plurality of tissue areas.

In some embodiments, the pixel value is a brightness value measured in Hounsfield units. However, embodiments are not limited to this and any suitable pixel values can be used instead. For example, pixel grayscale values can be used instead. In some embodiments, colour pixels can be used and the pixel value comprises a plurality of sub-pixel values (e.g. three sub-pixel values to correspond to each of the red, green and blue sub-pixels).

In some embodiments, the method comprises storing expected pixel values for the plurality of tissue areas, comparing the pixel values in the plurality of tissue areas against the expected pixel values, and identifying that the image is a potential altered image in response to determining that the pixel values in the plurality of tissue areas do not correspond to the expected pixel values.

In some embodiments, the method comprises identifying an external device as a suspicious device in response to determining that a predetermined threshold amount of potential altered images have been received from that device.

According to another aspect, there is provided a system for identifying a potential altered image, the system comprising a communication interface to receive an image; and an image storage to store a plurality of other images previously received by the system, wherein the processor is further configured to compare the received image to the plurality of other images and to identify that the image is a potential altered image in response to determining that a similarity level between the image and one of the other images is above a threshold similarity level.

In some embodiments, the threshold similarity level is a predetermined percentage of pixels in the image and the one other image having equal pixel values.

In some embodiments, the threshold similarity level is higher than 95% of pixels in the image and the one other image having equal pixel values.

According to another aspect, there is provided a method for identifying a potential altered image, the method comprising receiving an image; storing a plurality of other images previously received by the system, comparing the received image to the plurality of other images and identifying that the image is a potential altered image in response to determining that a similarity level between the image and one of the other images is above a threshold similarity level.

In some embodiments, the threshold similarity level is a predetermined percentage of pixels in the image and the one other image having equal pixel values.

In some embodiments, the threshold similarity level is higher than 95% of pixels in the image and the one other image having equal pixel values.

According to an aspect, there is provided an apparatus for identifying a potential altered image, the apparatus comprising: an image analysis unit to analyse an image and output a result indicating whether the image shows a predetermined feature; a processor, and a memory storing instructions to enable the processor to: obtain a first output from the image analysis unit for an image, the image comprising a plurality of pixels each having a pixel value, obtain an altered version of the image by adjusting pixel values of up to a predetermined threshold amount of pixels in the image, obtain a second output from the image analysis unit for the altered version of the image, determine whether the second output is different to the first output, and identify that the image is a potential altered image in response to determining that the second output is different to the first output.

The memory may comprise RAM, ROM, solid state memory; a removable disks a hard disk drive; magnetic media; an optical disk or any other type of storage. The apparatus may be provided on a single device or on multiple devices.

BRIEF DESCRIPTION OF THE DRAWINGS

Embodiments will now be described, by way of example only, with reference to the accompanying drawings, in which.

DETAILED DESCRIPTION OF THE EMBODIMENTS

Figure 1:
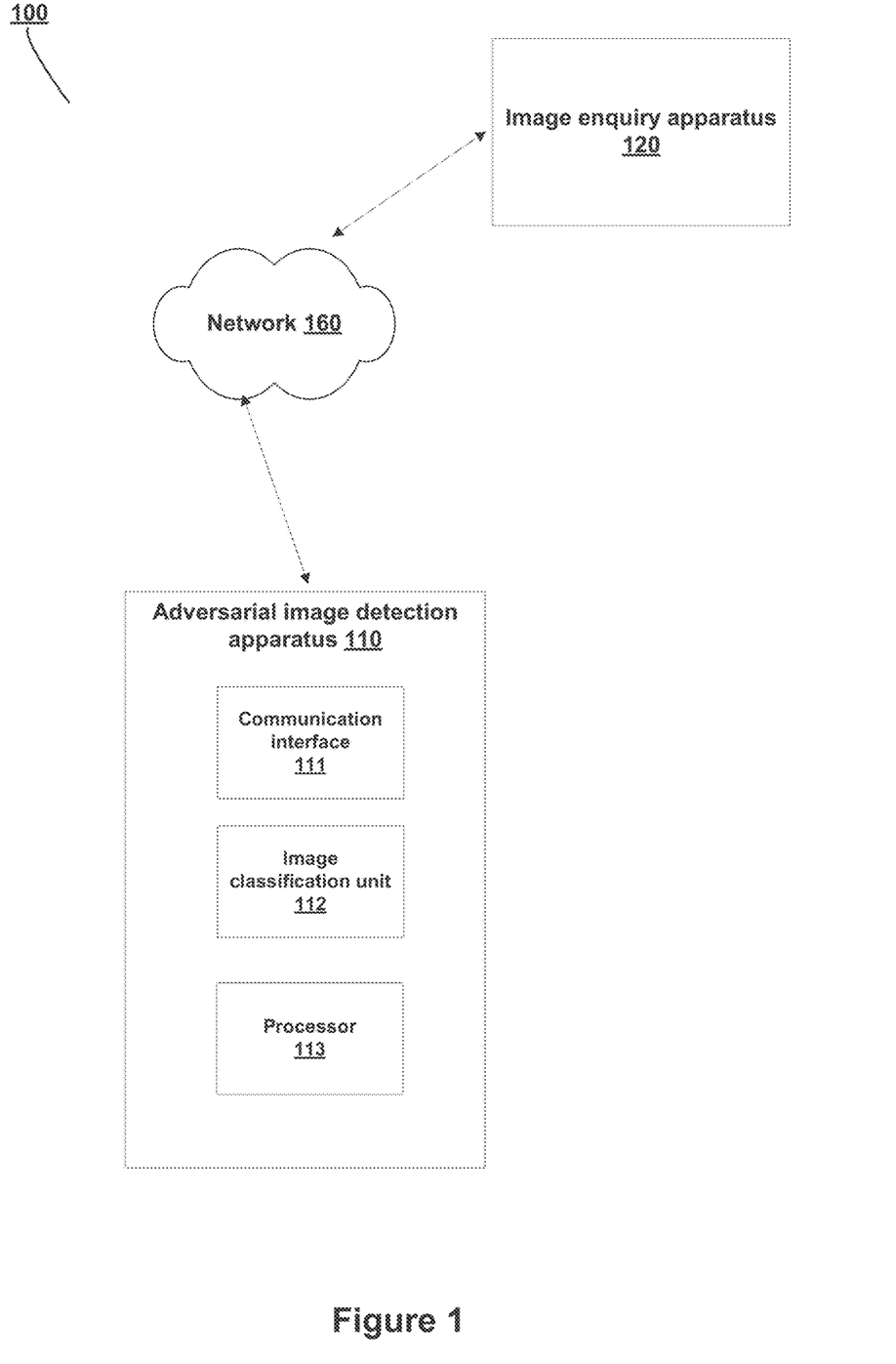
FIG. 1 shows a schematic illustration of a system according to a first embodiment.

FIG. 1 shows a system 100 according to a first embodiment. The system 100 comprises an adversarial image detection apparatus 110 and an image enquiry apparatus 120. The adversarial image detection apparatus 110 can communicate with the image enquiry apparatus over a network 160.

It will be appreciated that in practical implementations of embodiments, there may be many such image enquiry apparatuses and/or adversarial image detection apparatuses, but one of each will be described with relation to FIG. 1 for ease of explanation.

The network 160 in this embodiment is the internet. However, embodiments are not limited to this and any suitable communications technology could be used.

In this embodiment, the image enquiry apparatus 120 is configured to transmit an image to the adversarial image detection apparatus 110 over the network 160, and to receive an adversarial image detection result from the adversarial image detection apparatus 110. In other words, the image enquiry apparatus 120 is configured to receive a signal from the adversarial image detection apparatus 110 indicating whether the image sent by the image enquiry apparatus 120 is an adversarial image.

In this embodiment, the image enquiry apparatus 120 is a PC. However, in other embodiments, the image enquiry apparatus 120 could be implemented by a smartphone, PDA or other suitable computer device.

It will be appreciated that in some embodiments, the image enquiry apparatus may only send the image to the adversarial image detection apparatus (and not receive an adversarial image detection result), or the image enquiry apparatus may only receive an adversarial image detection result (i.e. without sending the image to the adversarial image detection apparatus).

As shown in FIG. 1, the adversarial image detection apparatus (or system) 110 comprises a communication interface 111, an image classification unit 112, and a processor 113. In this embodiment, the adversarial image detection apparatus 110 is a single apparatus. However, embodiments are not limited to this and the adversarial image detection functionality of other embodiments could be provided in more than one connected apparatuses. In other words, the adversarial image detection apparatus could be provided as a system for identifying potential altered images.

In this embodiment, the image enquiry apparatus 120 is a server. However, in other embodiments, the image enquiry apparatus 120 could be implemented by any other suitable computer device.

In this embodiment, the communication interface 111 is configured to communicate with the image enquiry apparatus 110 to receive an image from the image enquiry apparatus 120 and to send an adversarial image detection result to the image enquiry apparatus 120. However, embodiments are not limited to this. For example, in other embodiments, the communication interface may instead receive the image from a different source and/or may send the adversarial image detection result to a different apparatus, or simply store the results in a suitable storage for later retrieval.

The image classification unit 112 is configured to input the image received at the communication interface 111 and output a classification for the image. While classification is used as an example here, embodiments are not limited to this. More generally, any suitable image analysis unit which is capable of analysing an image to output a result indicating whether that image shows a predetermined feature, could be used instead. The image classification unit 112 will be discussed below, with reference to FIG. 2. In some embodiments, the image classification unit 112 is an AI classifier.

While this embodiment is discussed with reference to image classification, embodiments are not limited to this. It will be appreciated that in other embodiments, as well as variants of this embodiment, the machine learning model may instead perform detection or segmentation, for example.

The processor 113 is configured to control operations of the adversarial image detection apparatus 110. In this embodiment, this includes controlling the image classification unit 112 to classify an image, as well as controlling an attempt to change the classification of the image, as discussed further later. In addition, the processor 113 controls the communication interface 111 to send an adversarial image detection result to the image enquiry apparatus 120.

In this embodiment, the adversarial image detection apparatus 110 is a single apparatus. However, embodiments are not limited to this and the adversarial image detection functionality could be provided in more than one connected apparatus.

Figure 2:
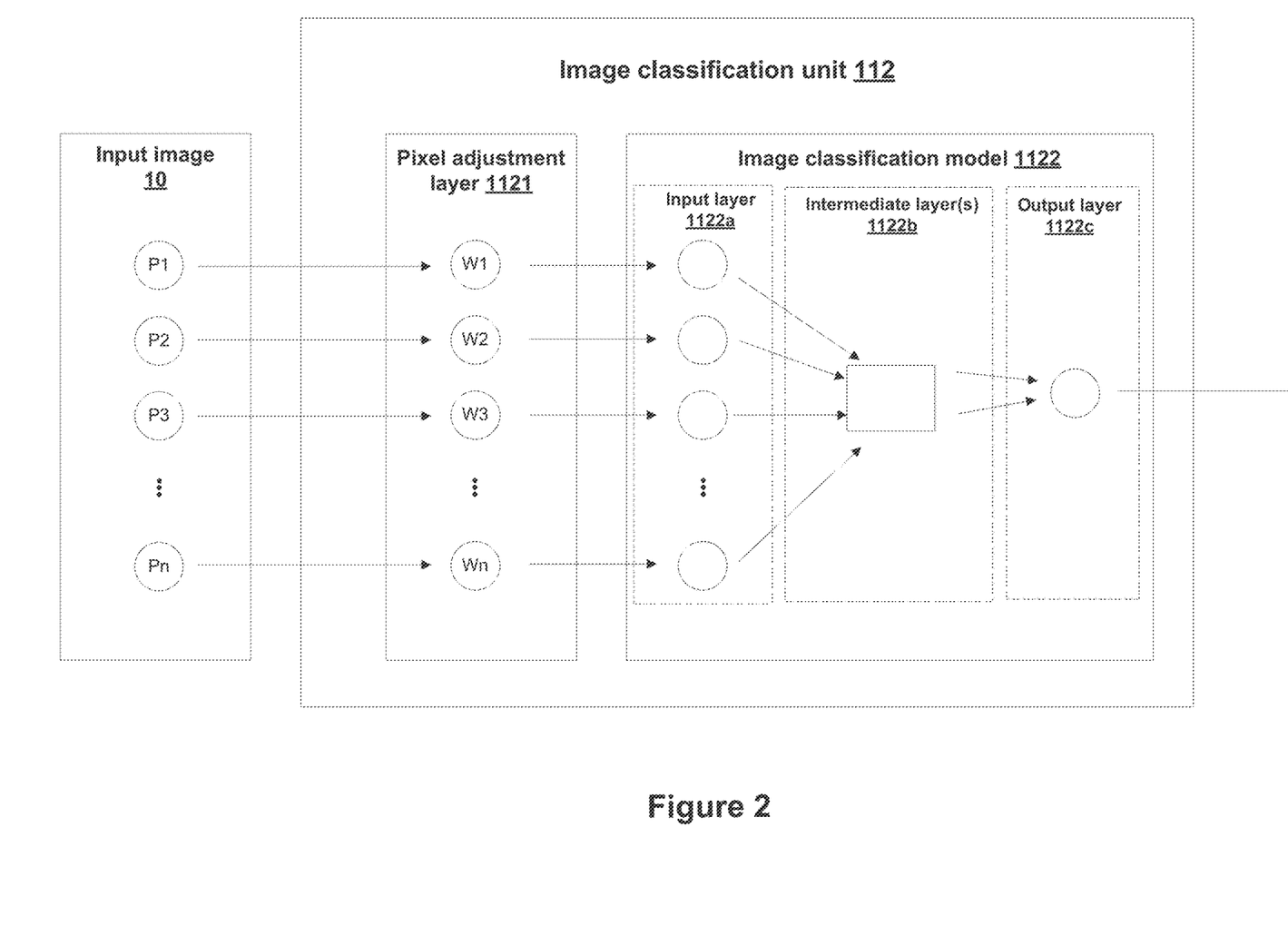
FIG. 2 shows a schematic illustration of an image classification unit according to the first embodiment.

FIG. 2 shows more detail regarding the image classification unit 112, as well as a schematic view of the pixels of an input image 10. The image classification unit 112 is configured to classify an input image using a machine learned model (specifically a convolutional neural network), as discussed in more detail below.

As shown in FIG. 2, the input image 10 comprises a plurality of pixel values (i.e. brightness values) P1 to Pn, representing each pixel in the image. In this embodiment, the input image 10 is a brain CT scan, and the pixel values are in Hounsfield units. However, embodiments are not limited to this, and any suitable image could be input instead. For example, other types of radiology image (i.e. medical scans), or other types of image altogether (including colour images) could be used instead. Such images could use different measurements of pixel values (e.g. pixel grayscale values instead of Hounsfield units).

The image classification unit 112 comprises a pixel adjustment layer 1121 and an image classification model 1122.

The pixel adjustment layer 1121 comprises a plurality of weights W1 to Wn, corresponding to the plurality of pixels P1 to Pn of the input image 10. The pixel adjustment layer 1121 is configured to receive the pixel values P1 to Pn of the input image 10, to apply the plurality of weights W1 to Wn to the plurality of pixels, and to output a plurality of weighted pixel values to the image classification model 1122.

In this embodiment, the pixel adjustment layer 1121 is configured to multiply the input pixel values P1 to Pn by their respective weights W1 to Wn to obtain an altered image. Hence, in this embodiment, the weights W1 to Wn are scalar values. For example, if the input value of the third pixel P3 was 10, and the third weight W3 was 4, the third weighted pixel value output by the pixel adjustment layer 1121 (and input to the image classification model 1122) would be 40. Furthermore, a weighting value of 1 would have no effect on the input pixel value. However, embodiments are not limited to this, and different weights (e.g. more complicated functions) could be used instead.

Put differently, the pixel adjustment layer 1121 is arranged to adjust the image (to create an altered image) to be input to the image classification model 1122 (i.e. the pixel adjustment layer 1121 changes the pixel values of the input image).

In this embodiment, the image classification model 1122 comprises a neural network comprising the input layer 1122a, intermediate layers 1122b and output layer 1122c. The input layer 1122a is configured to receive the plurality of weighted pixel values output by the pixel adjustment layer 1121. The input layer 1122a, intermediate layers 1122b and output layer 1122c are then configured to process the input weighed pixel values and to output a classification result.

In this embodiment, the neural network has been trained to classify lesions using backpropagation. In a variant of this embodiment, the backpropagation is combined with stochastic gradient descent. However, embodiments are not limited to this, and it will be appreciated that any suitable training algorithms could be used. For example, any of the Inception, AlexNet, or VGG16 frameworks could be used to train the image classification model 1122.

In this embodiment, the image classification model 1122 has been trained using a database of annotated brain CT images, to classify whether or not a lesion is present. The image classification model 112 is configured to output a value of 1 if a lesion is present and an output of 0 if a lesion is not present.

In this embodiment, the neural network is a convolutional neural network. However, embodiments are not limited to this and it will be appreciated that other embodiments could be implemented with other suitable machine learning models. Examples include support vector machines, logistic regression, Naïve Bayes, decision tree learning (e.g. C4.5 algorithm, multivariate adaptive regression splines (MARS), and reinforcement learning.

While the intermediate layers 1122b are shown as a single box in FIG. 2, it will be appreciated that this is merely for ease of illustration and that any suitable number of intermediate layers (including one) comprising any number of nodes could be used instead.

In this example embodiment, an output of 1 from the output layer 1122c corresponds to a classification of 'lesion', while an output of 0 corresponds to a classification of 'no lesion'. In other words, if the image classification model 112 outputs a value of 1, this indicates that the input image (i.e. the input brain CT scan) contains a lesion, whereas an output of 0 indicates that there is no lesion present. In this embodiment, the output layer 1122c is also configured to output a probability (i.e. decision confidence) of the output classification.

While, in this example embodiment, the image classification model 1122 has been trained using a database of annotated brain CT images to classify whether or not a lesion is present, embodiments are not limited to this. It will be appreciated that the image classification model 1122 could be trained to provide additional or alternative classifications (e.g. benign tumour or malignant tumour). Alternatively, the image classification model 1122 could be trained and used on different types of images (e.g. other radiology images such as MRI, or other types of images such as photographs).

While this embodiment is discussed with reference to one machine learning model, embodiments of are not limited to this. It will be appreciated that in some practical implementations of embodiments there may be many such machine learning models, and the outputs may be combined to increase the accuracy and confidence of the final output.

Furthermore, while this embodiment discusses the image classification unit 112 as having a separate pixel adjustment layer 1121 and image classification model 1122, this is for ease of explanation and embodiments are not limited to this. It will be appreciated that in practical implementations of embodiments, the pixel adjustment layer and image classification model can be provided as a single image classification model. In other words, the pixel adjustment layer 1121 can be provided as the input layer of the neural network (or other machine learned model).

Furthermore, while the output values of 1 and 0 are used here, embodiments are not limited this this, and any suitable outputs could be used instead. For example, embodiments are no limited to binary classification models.

While the image classification model 1122 comprises a neural network in this embodiment, embodiments are not limited to this. In some embodiments, the image classification model can instead be a non-AI classification model. In other words, the image classification model can be configured to classify an input image based on a pre-programmed set of rules.

Hence, the image classification unit 112 is arranged to receive an input image, adjust pixel values of the image, and then classify the image based on the adjusted (i.e. weighted) pixel values, by outputting a value.

Figure 3:
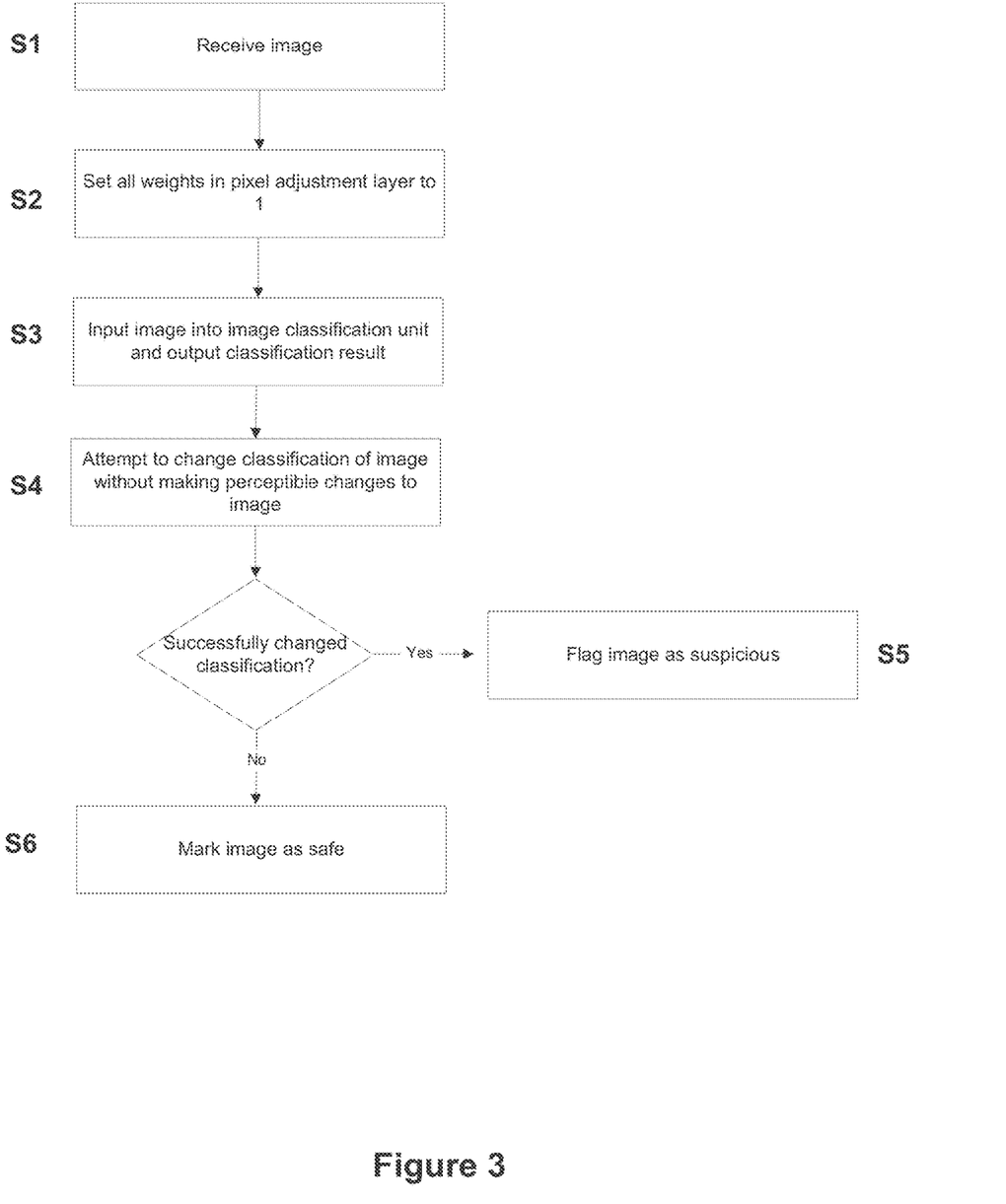
FIG. 3 shows a flow chart of the operation of the first embodiment.

FIG. 3 is a flowchart showing the operation of the adversarial image detection apparatus 110 of FIGS. 1 and 2. In the operation of FIG. 3, the adversarial image detection apparatus 110 determines whether a received image is an adversarial image by attempting to change its classification by making minor changes to the image and inputting it to the image classification model 1122c for classification, as discussed in detail below.

At step S1 of FIG. 3, the communication interface 111 of the adversarial image detection apparatus 110 receives image data (corresponding to an image, specifically a brain CT scan) from the image enquiry apparatus 120. The image data comprises a plurality of pixel values P1 to Pn corresponding to a plurality of pixels of the image.

In variants of this embodiment, the adversarial image detection apparatus may instead retrieve the image from a suitable storage or receive it from a different apparatus.

At step S2, the processor 113 controls the image classification unit 112 to set all weights in the pixel adjustment layer 1121 to be 1. In other words, the pixel adjustment layer 1121 is controlled to have no effect on an input image.

At step S3, the processor 113 inputs the received image 10 into the image classification unit 112 and obtains a classification output from the image classification unit 112 (i.e. the image classification unit 112 obtains a first output for the image, indicating whether a lesion is or is not shown). For example, the output value may be '1' with a probability (i.e. decision confidence) of 0.9, indicating that a high confidence that the classification is lesion. However, embodiments are not limited to this. In a variant of this embodiment, step S2 is skipped and the image is input directly into the image classification model 1122 (i.e. the image data is not first input into the pixel adjustment layer 1121).

At step S4, the adversarial image detection apparatus 110 attempts to reverse the classification of the image by changing the weights W1 to Wn in the pixel adjustment layer 1121 using backpropagation, without making perceptible changes to the image. Here, 'perceptible' is used to mean that an observer would be likely to notice the changes if they compared the changed image to the original image. Hence, non-perceptible changes are unlikely to be noticed by an observer (e.g. because only a few pixel values have been changed). In other words, the adversarial image detection apparatus obtains an altered version of the image by adjusting pixel values of up to a predetermined threshold amount of pixels in the image, obtains a second output from the image analysis unit for the altered version of the image, and determines whether the second output is different to the first output.

For example, if the original classification of the input image was '1', indicating the presence of a lesion, then the adversarial image detection apparatus 110 attempts to adapt the original image into a new image which the image classification model 1122 classifies as 'no lesion' (by outputting a value of 0). In other words, the image detection apparatus 110 sets the desired (or target) output of the image classification unit 112 as '0', indicating no lesion is present. Then, the image detection apparatus 110 uses backpropagation to change the weights W1 to Wn in the pixel adjustment layer 1121, to change the output classification of the input image to the desired output (e.g. 'no lesion'). In other words, the image detection apparatus 110 effectively uses the input image with the set desired output (e.g. no lesion) as a training image, and uses backpropagation to 'train' the image classification unit 112 to output the desired output (e.g. no lesion).

However, in this embodiment, the image detection apparatus 110 only allows the weights W1 to Wn in the pixel adjustment layer to be changed. In other words, the weights of each layer in the image classification model 1122 are 'locked', and the image detection apparatus 110 attempts to achieve the desired output by only changing the weights W1 to Wn in the pixel adjustment layer.

Put differently, the image detection apparatus 110 performs backpropagation on the pixel adjustment layer to change the weights W1 to Wn, based on a target output of the image detection apparatus being '0'.

By only changing the weights W1 to Wn in the pixel adjustment layer 1121, this has the effect that an adjusted image is input into the image classification model 1122 for classification. Hence, the image detection apparatus 110 effectively attempts to change the image input into the image classification model 1122 until the desired classification (i.e. desired output e.g. no lesion) is achieved.

In this embodiment, when performing the backpropagation, the image detection apparatus 110 uses the binary cross-entropy loss function, as shown in Equation 1:

$$\text{Loss} = -(y \log(p) + (1-y)\log(1-p)) \quad \text{[Equation 1]}$$

wherein y represents the desired output (e.g. 0 for no lesion) and p represents the probability value (i.e. decision confidence) of the desired output, output by the image classification unit 112.

While the binary cross-entropy loss function shown in Equation 1 is used in this embodiment, other embodiments are not limited to this. It will be appreciated that for an image classification unit 112 which performs non-binary classification, the non-binary cross-entropy loss function can be used instead. In addition, other loss functions could be used instead, such as the L2 loss function.

When, performing this backpropagation, the image detection apparatus 110 applies an 'imperceptibility principle'. In other words, the image detection apparatus 110 is configured to adjust the image such that a user viewing the adjusted image would be unlikely to notice any differences from the original image. In this embodiment, the imperceptibility principle is applied by limiting the number of weights W1 to Wn which can be changed in the image to ten. In other words, only ten pixels in the original input image 10 can be changed.

In other words, the image detection apparatus is arranged to adjust up to a predetermined amount of weights by performing backpropagation on the pixel adjustment layer 1121 to adjust up to a predetermined amount of weights corresponding to a predetermined threshold amount of pixels. The backpropagation based on a target of obtaining an output from the image classification unit 112 which is different to the output of the input image (e.g. to obtain 'no lesion' if the original output was 'lesion'.

Once the backpropagation has been performed, the image detection apparatus 110 applies the weights W1 to Wn (including the weights changed by the backpropagation) to the image to adjust the image. Then, the adjusted image is input to the image classification model 1122, and if the classification result is '0' (indicating no lesion), then the image detection apparatus determines that it has been able to successfully change the classification.

While the imperceptibility principle in this embodiment allows for a maximum of ten of the weights W1 to Wn being changed, embodiments are not limited to this. In variants of this embodiment, other limits could be applied as the imperceptibility principle. For example, a different maximum number of pixels (e.g. 20) could be applied, a maximum percentage of pixels (e.g. 0.01%) or a maximum number of pixels per unit area (e.g. a limit of 5 pixels in a 100×100 pixel image) could be used instead.

Hence, the use of an imperceptibility principle accounts for the fact that, if a genuine image of a lesion was input without the imperceptibility principle being applied (i.e. if any number of weights W1 to Wn could be changed), this back propagation approach would change the weights W1 to Wn such that the genuine lesion was removed. By applying the imperceptibility principle, no noticeable changes are made to the image, and the image detection apparatus 110 can instead determine a likelihood that the image is an adversarial attack in which a small number of pixels have been changed to change the classification (e.g. to 'lesion' when there is not actually a lesion present).

While step S4 has been discussed using this specific example, embodiments are not limited to this. Any suitable method (e.g. any backpropagation method) for changing the weights W1 to Wn in the pixel adjustment layer 1121 so as to change the classification of the input image, while applying the imperceptibility principle, could be used instead.

In a variant of this embodiment, at step S4, the adversarial image detection apparatus instead chooses a subset of random pixels, without any clusters above a predetermined size (e.g. five) and attempts to reverse the classification by changing the value of these pixels. In particular, the adversarial image detection apparatus stores a list of possible changes (i.e. changes in pixel values in the image) that improve the cost function (i.e. the loss function discussed above), and works through the list of changes, while not implementing (i.e. ignoring) any changes in the list that violate the imperceptibility principle.

If the adversarial image detection apparatus 110 is successful in changing the image classification while applying the imperceptibility principle, then at step S5, the adversarial image detection apparatus 110 flags the image as suspicious (i.e. identifies that it is a potential altered image), indicating that it is likely that the originally input image is an adversarial image. In other words, the adversarial image detection apparatus 110 determines that it is likely that the image received from the image enquiry apparatus 120 was not an original image, but was an adapted version of the original, in which a small number of changes had been made so as to cause it to be incorrectly classified by the image classification model. Hence, the image is identified as a potential altered image.

For example, the adversarial image detection apparatus 110 may determine that, despite the image classification model 1122 originally classifying the image received from the enquiry apparatus 120 as a lesion, it may subsequently determine that the classification could be changed to no lesion by changing only a few pixel values (and therefore these pixel values may have been changed from the original image before being received at the adversarial image detection apparatus 110). Since, the classification can be changed with only minor changes to the image, the adversarial image detection apparatus 110 determines that it cannot be confident with its original classification, and therefore flags the image as suspicious (i.e. as having a low confidence that the original classification was correct).

If the adversarial image detection apparatus 110 was not able to successfully change the classification of the image, then it determines that the original classification was correct, and that the received image is not suspicious, and marks it as safe. In other words, the adversarial image detection apparatus 110 determines that the received image is unlikely to be an adversarial image.

At step S5 and S6, the adversarial image detection apparatus 110 transmits the result to the image enquiry apparatus 120 via the communication unit 111. However, embodiments are not limited this. For example, in alternative embodiments, the result could be transmitted to a different apparatus, stored for later retrieval, or displayed on a display panel at the adversarial image detection apparatus 110.

Hence, by using backpropagation to change the weights W1 to Wn in the pixel adjustment layer 1121 (i.e. by performing backpropagation on the pixel adjustment layer), the adversarial image detection apparatus 110 of this embodiment is able to effectively determine whether an input image could be adapted, to change its classification, without changing the visual appearance of the image to a user (i.e. so that a user would be unlikely to notice the changes). As such, the adversarial image detection apparatus 110 can determine whether the input image 10 is likely to be an adversarial image in which a small number of pixels have been changed so as to change the classification.

AI image classifiers in the medical domain are particularly susceptible adversarial attacks. There is a possibility that information on diagnostic images could be altered, for example, to defraud insurance companies into paying for additional tests and/or surgical procedures. For example, an original computed tomography (CT) scan may be classified as 'no lesion' when put into an AI classifier. However, by changing a few pixels in the scan (such that the differences are unlikely to be noticed by observers) and then inputting this altered image into the AI classifier, the classification may instead be output as 'lesion' (e.g. requiring lengthy and costly follow up or even an unnecessary surgical procedure).

By applying the method of FIG. 3 in which the adversarial image detection apparatus 110 attempts to reverse such changes in a received image, the adversarial image detection apparatus 110 can identify whether the received image is likely to be part of an adversarial attack, and flag it as suspicious (i.e. identify that it is a potential altered image).

While this embodiment has been discussed using an example of a CT brain scan with the classification being a binary lesion or no lesion, embodiments are not limited to this. It will be appreciated that the adversarial image detection apparatus 110 could also be applied to other types of image.

Furthermore, while the imperceptibility principle in this embodiment allows for a maximum of ten of the weights W1 to Wn being changed, embodiments are not limited to this. In variants of this embodiment, other limits could be applied as the imperceptibility principle. For example, a different maximum number of pixels (e.g. 20) could be applied, a maximum percentage of pixels (e.g. 0.01%) or a maximum number of pixels per unit area (e.g. a limit of 5 pixels in a 100×100 pixel image) could be used instead.

In this embodiment, the adversarial image detection apparatus 110 always attempts to change the classification of the image to identify whether it is likely to be an adversarial image. However, embodiments are not limited to this. For example, in a variant of this embodiment, if the probability output at step S3 is above 0.9 (on a scale of 0 to 1), then the adversarial image detection apparatus 110 determines that it is confident regarding the classification, and there is a low risk of the image being an adversarial image. As such, the method could proceed straight to step S6 (i.e. skipping steps S4-S5).

For ease of explanation, this embodiment has been discussed with reference to a binary classification (e.g. only "lesion" or "no lesion" present in an image). Embodiments are not limited to this, and it will be appreciated that more complex, non-binary classification can be used instead.

Figure 4:
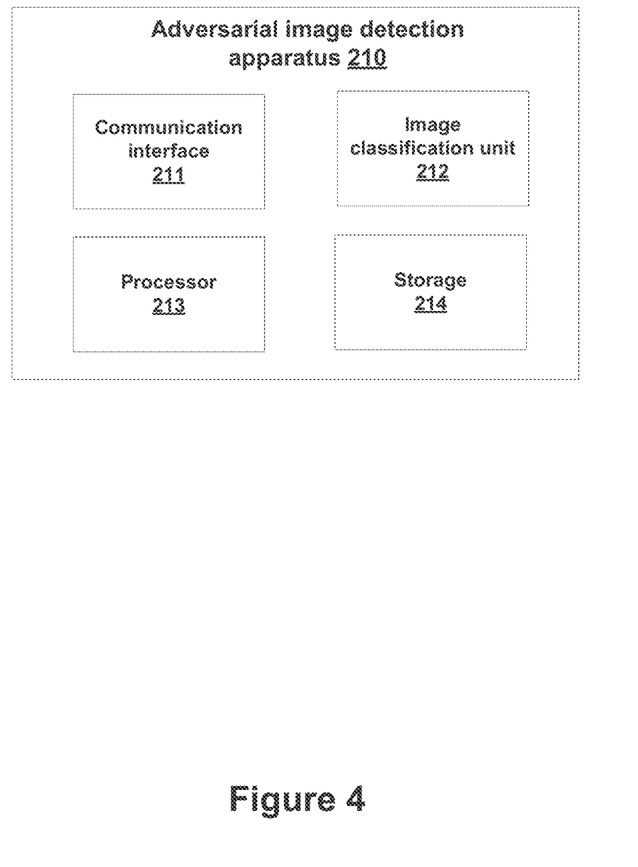
FIG. 4 shows a schematic illustration of an apparatus according to a second embodiment.

FIG. 4 shows an adversarial image detection apparatus 210 according to a second embodiment. In addition to the functionality of the adversarial image detection apparatus 110 of the first embodiment, the adversarial image detection apparatus 210 of the second embodiment is further configured to identify a likely adversarial attack based on history information. In other words, the adversarial image detection apparatus 210 of the second embodiment is further configured to compare a received image to images which were previously received, to determine whether a slightly different version of the received image has been previously received, thereby indicating that the received image is likely to be an adversarial image. This is discussed in detail below.

In FIG. 4, the adversarial image detection apparatus 210 is shown in isolation (i.e. not as part of a system including a network and image enquiry apparatus). It will be appreciated that this is for ease of explanation, and that the adversarial image detection apparatus 210 of the second embodiment can be included as part of a system including an image enquiry apparatus and a network. In other words, the discussion of the second embodiment focuses on the internal functionality of the adversarial image detection apparatus 210. The external communication functionality is the same as in the first embodiment.

Similarly to the adversarial image detection apparatus 110 of the first embodiment, the adversarial image detection apparatus 210 of the second embodiment comprises a communication interface 211, an image classification unit 212, and a processor 213. These three components have the same respective functionality as the communication interface 111, image classification unit 212 and processor 213 of the first embodiment, and repeated explanations of these functionalities are omitted. Hence, only the additional functionality of these components is discussed with reference to FIG. 4.

As shown in FIG. 4, the adversarial image detection apparatus 210 of the second embodiment further comprises a storage 214. The storage 214 is configured to store history information. In this embodiment, the history information is the last 1000 images received by the communication interface 211. While 1000 images are stored here, embodiments are not limited to this. For in one variant of this embodiment, only 100 previous images are stored. In another variant, all images received by the communication interface 211 are stored in the storage 214. Put differently, the adversarial image detection apparatus 210 comprises an image storage which stores a plurality of other images previously received by the image detection apparatus 210.

In addition to the functionality of the processor 113 of the first embodiment, the processor 213 of the second embodiment is further configured to compare a received image to the history information stored in the storage, so as to identify an adversarial attack. This will be discussed in more detail with reference to FIG. 5.

Figure 5:
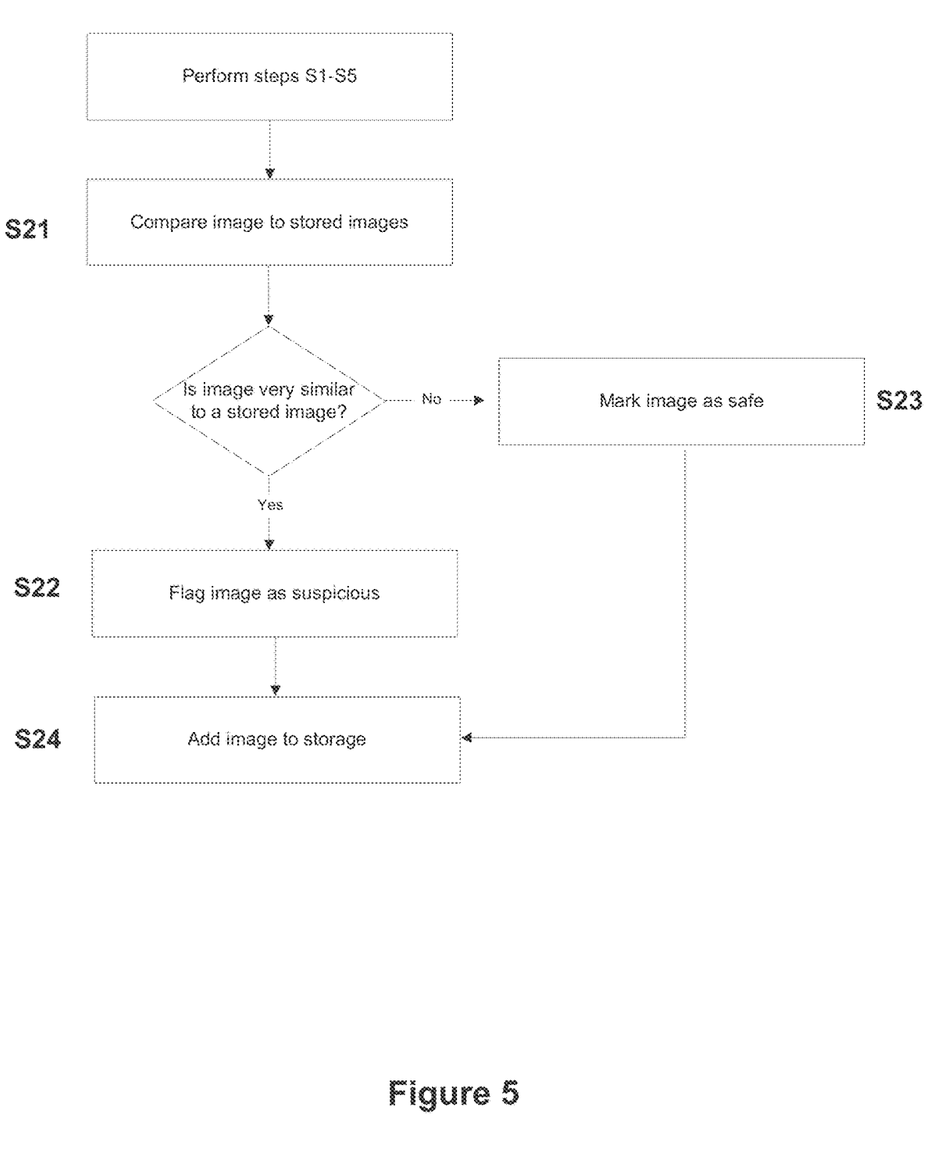
FIG. 5 shows a flow chart of the operation of the second embodiment.

FIG. 5 is a flowchart showing the operation of the adversarial image detection apparatus 210 in the second embodiment.

FIG. 5 begins by performing steps S1-S5 of FIG. 3. In other words, the adversarial image detection apparatus 210 attempts to change the classification of a received image with only non-perceptible changes, and flags the image as suspicious if successful.

Put differently, in steps S1-S5, the adversarial image detection apparatus receives an image, attempts to determine whether the image is an adversarial image in which non-perceptible changes have been made, and the flags the image if the adversarial image detection apparatus 210 determines that non-perceptible changes are likely to have been made.

Next, instead of performing step S6 (i.e. instead of marking the image as safe), the adversarial image detection apparatus 210 proceeds to step S21. In other words, the method continues to step S21 if it was not flagged as suspicious at step S5. At step S21, the processor 213 compares the received image to the images stored in the storage 214. Specifically, the processor 213 compares each pixel value in the received image to those of each image stored in the storage 214, to determine whether the received image is very similar to any of the stored images. As discussed in more detail later, the processor 213 determines that the received image is very similar to a stored image if a large proportion (e.g. 99%) of the pixels in the received image and the stored image have the same pixel value.

In other words, the processor 213 determines whether the same image (with only a few pixel values having been changed) has been received before. This allows the adversarial image detection apparatus 210 to identify an adversarial attack in which an adversarial attacker has had a number of attempts of changing a small number of pixels in the image in such a way that the classification changes. In other words, it may take a user a number of attempts to successfully create an adversarial image. Hence, by comparing received images to previously received images (i.e. previous attempts stored in the storage), the adversarial image detection apparatus 210 can determine whether the same image (with only minor changes) is being repeatedly submitted until the classification changes.

In this embodiment, at step S21 the processor 213 determines whether 99% of the pixels in the received image are the same as those in a stored image. If 99% of the pixels in the received image are the same as those in a stored image, the adversarial image detection apparatus 210 proceeds to step S22 and flags the image as suspicious, indicating that it is likely to be an adversarial attack. In this embodiment, the adversarial image detection apparatus 210 stores the flag in the storage 214, so that it can be later accessed by a user when desired (e.g. by requesting it through the communication interface).

Put differently, the processor 213 determines whether a similarity level between the image and one of the stored image is above a predetermined threshold similarity level (e.g. 99% of pixels have the same pixel values), and if the similarity level is above the threshold similarity level, the processor 213 identifies that the image is a potential altered image.

While the threshold of 99% of pixels being the same is used here, embodiments are not limited to this. It will be appreciated that in variants of this, other thresholds (such as other percentages or absolute numbers of pixels) could be used, or any other suitable method for comparing image similarities could be used instead. For example, in some embodiments, multiplication by a scalar close to one or addition of random noise can be used. In other words, in some embodiments, the processor could divide one image by another (pixel by pixel) and if all the ratios (or, for example, 99% of them) are equal to each other, then the two images are considered similar. Alternatively (or additionally), the processor could subtract one image from another (again, pixel wise). If the result is a random noise with a small amplitude, then the images are considered similar.

In a variant of this embodiment, the adversarial image detection apparatus could also flag the source of the image as suspicious. For example, in a variant in which the adversarial image detection apparatus receives images from a plurality of image enquiry apparatuses, an image enquiry apparatus which transmits a plurality of suspicious images to the adversarial image detection apparatus could be flagged as suspicious itself.

If the processor 213 determines that there is less than a 99% similarity of the pixels in the received image and the pixels in any of the stored images, then at step S23, the adversarial image detection apparatus 210 marks the image as safe at step S23.

At step S22 and S23, the adversarial image detection apparatus 210 transmits the result to the image enquiry apparatus via the communication unit 211. However, embodiments are not limited this. For example, in alternative embodiments, the result could be transmitted to a different apparatus, stored for later retrieval, or displayed on a display panel at the adversarial image detection apparatus.

After step S22 or step S23 takes place, the method proceeds to step S24, in which the received image is added to the storage 214 as a part of the history information for future comparisons.

Hence, steps S21-S24 of FIG. 5 provide an additional method for identifying whether an image is an adversarial image. Since it will often take an adversarial attacker a number of attempts to successfully create an adversarial image, the adversarial image detection apparatus 210 compares received images to stored images, to determine whether a user has already submitted that image (with only a small number of pixels having been changed).

While steps S2-S5 are also performed in this embodiment, embodiments are not limited to this. For example, the method could proceed directly from step S1 to step S21 (thereby skipping steps S2-S6). Alternatively, in a variant of this embodiment, the adversarial image detection apparatus 210 could compare the received image to the stored images before attempting the change the classification of the image (i.e. before steps S2-S6 of FIG. 3).

In a variant of this embodiment, the adversarial image detection apparatus 210 may be configured to receive images from a plurality of different apparatuses (i.e. a plurality of image enquiry apparatuses). When performing the comparison with stored images, the adversarial image detection apparatus 210 may first (or only) compare the received image to stored images which were received from the same apparatus, since it is likely that the adversarial attacker would submitted the same image from the same apparatus.

In another variant of this embodiment, the adversarial image detection apparatus 210 may always perform steps S21-S24, even if the image has already been flagged as suspicious (at step S5). This could be used to determine a confidence level of the adversarial image determination. For example, if an image was flagged as suspicious both from the adversarial image detection apparatus 210 attempting to change its classification, and from the comparison with stored image, then the adversarial image detection apparatus 210 could assign a high confidence level to the flag (and therefore a low confidence level to the original classification).

Figure 6:
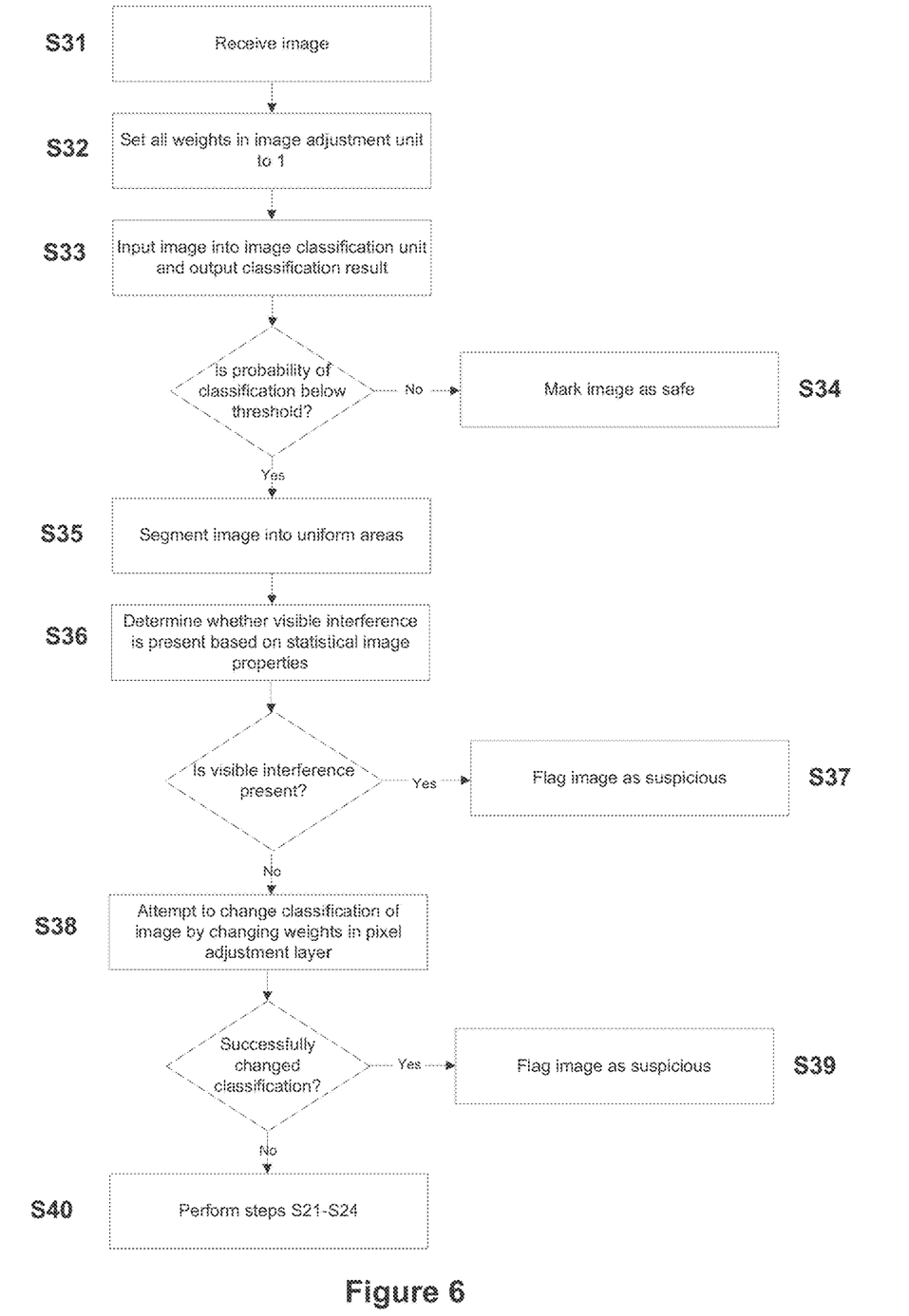
FIG. 6 shows a flow chart of the operation of the second embodiment.

FIG. 6 is a flowchart showing the operation of the adversarial image detection apparatus 210 according to a variant of the second embodiment. In addition, to the functionality of the second embodiment discussed above, in this variant the adversarial image detection apparatus 210 is further configured to identify whether perceptible interference is present in the received image. In other words, the adversarial image detection apparatus 210 is further configured to determine whether more major changes have been made to the image, which are likely to be noticed by a human observer (e.g. adding a tumour). This method is discussed in detail below.

Steps S31-S33 are similar to step S1-S3 of FIG. 3. Specifically, at step S31, the communication interface 211 of the adversarial image detection apparatus 210 receives image data (corresponding to an image, specifically a brain CT scan) from the image enquiry apparatus 120. The image data comprises a plurality of pixel values P1 to Pn corresponding to a plurality of pixels of the image.

In variants of this embodiment, the adversarial image detection apparatus may instead retrieve the image from a suitable storage or receive it from a different apparatus.

At step S32, the processor 113 controls the image classification unit 112 to set all weights in the pixel adjustment layer 1121 to be 1. In other words, the pixel adjustment layer is controlled to have no effect on an input image.

At step S33, the processor 213 inputs the received image into the image classification unit 212 and obtains a classification output from the image classification unit 212. For example, the output value may be '1' with a probability of 0.7, indicating that the image is classified is a lesion, but that the classification unit is not confident that it is correct. Embodiments are not limited to this. In a variant of this embodiment, step S32 is skipped and the image is input directly into the image classification model 1122 (i.e. the image data is not first input into the pixel adjustment layer 1121).

The processor 213 then determines whether the probability of the classification is below a threshold (i.e. determines whether the probability is within a threshold distance of the decision border). In this embodiment the threshold is 0.9. If the probability is above the threshold, then at step S34, the adversarial image detection apparatus 210 determines that, since it is confident regarding the classification, the image is unlikely to be an adversarial image, and the image is marked as safe.

While a probability threshold of 0.9 is used here, this is merely an example and it will be appreciate that in embodiments, any suitable threshold could be used, or the method could always proceed to step S35.

If the probability of the classification is below the threshold, then the adversarial image detection apparatus 210, proceeds to step S35 and segments the image into uniform areas. In this embodiment, the processor 213 of the adversarial image detection apparatus 210 performs the segmentation by grouping areas of the image according to their average pixel values.

Figure 7:
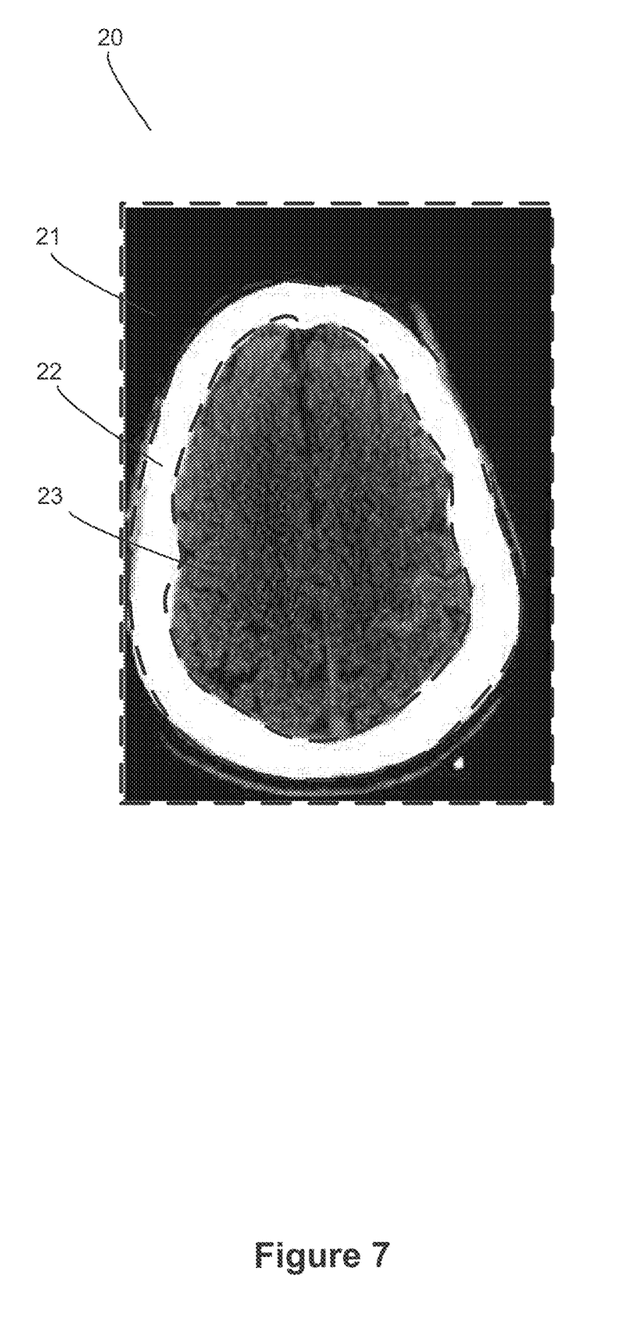
FIG. 7 shows an example image.

FIG. 7 shows an example image 20 which is a CT brain scan that has been segmented into three uniform areas 21, 22 and 23. As shown in FIG. 7, the first area 21a is simply a black area surrounding the head. The second area 22 is a white area representing the skull. The second area has an average Hounsfield value of 1000. The third area 23 is a grey area representing brain tissue. The third area 23 has an average Hounsfield value of 100.

While the image of FIG. 7 is shown as being segmented into only three areas, it will be appreciated that this is merely for ease of explanation, and that a more detailed segmentation can be performed in practical implementations of embodiments. For example, the third area 23 of the image could be segmented further into different specific features such as blood vessel tissue.

Embodiments are also not limited to this segmentation method and any suitable segmentation method could be used instead. For example, a machine learned model, trained to segmented images into certain areas (e.g. brain tissue and bone tissue) could be used instead.

At step S36, the processor 213 of the adversarial image detection apparatus 210 determines whether perceptible interference is present in the image 20. In contrast to the non-perceptible changes discussed above, a perceptible change is one which is likely to be noticed by a human observer. For example, a user may have adapted a brain CT scan which originally did not show a lesion, such that it now shows a lesion. In this embodiment, the adversarial image detection apparatus 210 determines whether perceptible interference is present by analysing the statistical image properties of each uniform area. For example, it is known that bone tissue should have pixels with a high Hounsfield value in a CT scan (e.g. 1000). The processor can determine that the second area 22 in FIG. 7 shows bone, based on its average Hounsfield value. If an assessment of the statistical image properties of the second area 22 shows a number of low density pixels (e.g. with a Hounsfield score of under 100), this indicates that the image has been altered, because bone tissue should not have a Hounsfield value this this low.

In other words, at step S36 the adversarial image detection apparatus 210 compares actual values of pixels in the image against expected values. If the actual values do not match the expected values, then at step S37, the adversarial image detection apparatus 210 flags the image as suspicious. Put differently, the adversarial image detection apparatus 210 comprises a pixel value storage to store expected pixel values, and the then compare s the actual pixel values to the expected pixel values.

This method is applicable to any type of image in which expected values can be predicted. In particular, in the medical domain (e.g. in radiology scans), it is possible to determine what different pixel values should be (e.g. what is physically possible/likely based on the human or animal anatomy), and therefore possible to determine whether an image has been altered.

Additional or alternative methods for identifying changes can be applied at step S36, such as analysing the metadata of the image. For example, the metadata may indicate that the image has been altered. In another example, the adversarial image detection apparatus 210 may flag the image as suspicious if there is a lack of metadata. In yet another example, the adversarial image detection apparatus 210 stores a memory bank of past lesions (e.g. the last 1000 images classified as having lesions) and the processor compares the image to memory bank to determine whether there is a correlation between the newly identified lesion and those kept in the memory (and therefore determines whether the lesion is 'real' or whether the image has been modified to add a lesion. In other words, if the lesion correlates very closely to previously identified lesions, this indicates that a number of similar images have been submitted, indicating a deception attempt. In some embodiments, more than two similar lesions is sufficient to identify such an attempt.

If the adversarial image detection apparatus 210 determines that perceptible interference is not present, then the method proceeds to step S38, in which the adversarial image detection apparatus 210 attempts to change the classification of the image by changing weights in the pixel adjustment layer.

Step S38 is performed in a similar manner as discussed with reference to step S4 of FIG. 3. However, in this variant of this embodiment, as well as limiting the total number of weights which can be changed to ten, the adversarial image detection apparatus 210 also applies the limitation that the total number of weights (which correspond to pixels) in each area of the image that can be changed is limited to five.

For example, in the image 20 of FIG. 7, the total number of weights which can be changed is ten, and no more than five weights can be changed in any one of the first area 21, the second area 22, or the third area 23. This extra limitation helps to ensure that the changes made in the image are not focused on any one particular area, and therefore remain non-perceptible (unlikely to be noticed by a human observer).

If the adversarial image detection apparatus 210 is successful in changing the classification, the image is flagged as suspicious at step S39. If not, then at step S40, the steps S21-S24 of FIG. 5 are performed. In other words, the image is then compared to the history information stored in the storage 214 to determine whether essentially the same image has been submitted before, and the image is flagged as suspicious if it has.

Hence, in this variant of the second embodiment, the adversarial image detection apparatus 210 applies three tests to determine whether the image is likely to be an adversarial image. The first is to detect non-perceptible interference, the second is to detect perceptible interference, and the third to determine whether the same image has been repeatedly received with small changes to try to change its classification.

As discussed above, by segmenting the image into uniform areas (e.g. uniform tissue areas), the adversarial image detection apparatus can be more confident of its determination as to whether or not the received image is an adversarial image. In particular, in the medical domain, diagnostic images feature a certain predefined structure. As discussed above, CT scan of the brain will feature bones and brain tissue which have very different characteristics. In addition, it may feature pathologies such as tumours or bleeds. Each area (tissue) is characterized by its own statistic (e.g. average pixel value, variance etc.). Hence, the predefined structure can be used to identify two types of adversarial attacks.

Firstly, perceptible attacks can be identified (i.e. at step S36), where pixel changes do not match expected local statistics and therefore can be detected (e.g. the image may have an added tumour that doesn't exist in reality). Secondly, non-perceptible attacks can be identified (i.e. at step S38) through applying the backpropagation technique to attempt to change the classification. In addition, the history information can be assessed to identify such non-perceptible (or even perceptible) changes.

While this has been discussed with reference to a brain CT scan, it will be appreciated that this can be applied to any image in which an expected structure can be determined.

In a variant of this embodiment, at step S38, the adversarial image detection apparatus is limited to only changing weights corresponding to one of the segmented image areas of the image. In the example image of FIG. 7, the adversarial image detection apparatus could be limited to only changing weights corresponding to the third area 23 representing brain tissue. This is because it may be determined that only brain tissue (and not bone tissue) can have the lesion which the image classification unit 112 is configured to classify. As such, it can be presumed that due to its training, the image classification unit 112 ignores the bone tissue when performing classification, and focuses only on the brain tissue. Therefore, since it is known that changes in bone tissue will not affect the classification, no such changes are attempted. As such, the number of available weights to change becomes smaller, resulting in decreased computation time being needed.

In another variant of the method of FIG. 6, the adversarial image detection apparatus does not determine whether the probability of the classification is below the threshold, and continues directly from step S33 to step S35. In another variant, the adversarial image detection apparatus only continues with steps S35 onwards if a particular classification result (e.g. a lesion or a malignant tumour i.e. 'bad' or 'important') is output. Furthermore, in some variants, even if perceptible interference is identified at step S36, the method may still continue to step S8 to attempt to determine non-perceptible changes.

Furthermore, while a specific order of steps has been shown in FIG. 6, it will be appreciated that embodiments are not limited to this. Any combination and order of the three adversarial image detection methods (i.e. analysing statistical image properties, attempting to reverse the classification, and comparing with history information) could be used instead. For example, steps S36-S37 could be skipped, and the method could proceed directly from step S35 to step S38.

In some embodiments, flagging the image as suspicious comprises reducing the probability of the original classification. For example, this could comprise halving the probability of the classification if interference is detected based on statistical image properties (as discussed with reference to step S36 of FIG. 6). Then, if the adversarial image detection apparatus successfully manages to change the classification of the image by adjusting the pixel values by adjusting the weights in the pixel adjustment layer, the probability could be again be halved. Furthermore, if the image is similar to an image stored in the storage, the probability could be halved again. Hence, each time a suspicion flag is raised, the confidence in the classification is reduced, rendering the adversarial attack ineffective.

In another variant, each of the three methods could have different importance weightings. For example, successfully changing the classification could reduce the confidence more than identifying perceptible changes.

As discussed above, the adversarial image detection apparatus of embodiments can analyse received images to determine whether they are likely to be adversarial attacks. In other words, the adversarial image detection apparatus can determine whether a received image is likely to have been altered by a user (or apparatus) before being sent to the adversarial image detection apparatus, so as to achieve a desired classification. This determination is achieved by, among other things, making small adaptations to the image to attempt to change its classification, by comparing the image to previously received images, and by segmenting the image into uniform areas and analysing the statistical properties of pixels in these areas.

In one example, these methods can be applied to the medical domain Since the general structure of medical images (e.g. CT scans) is known, these images can be segmented into uniform tissue areas and compared to expected statistical values for these areas. Furthermore, since it is known which parts of an image can and cannot have certain features (e.g. a brain tumour would be in the brain tissue, not the surrounding bone), the adversarial image detection apparatus can focus on those areas when changing pixel values to attempt the change the classification, since it can be determined that the image classification model 1122 will focus only on those areas (e.g. brain tissue, not bone), when performing the classification.

As previously discussed, AI image classifiers, particularly in the medical domain, are susceptible adversarial attacks. For example, malicious users may alter diagnostic images to defraud insurance companies into paying for additional tests and/or surgical procedures. For example, an original computed tomography (CT) scan may be classified as 'no lesion' when put into an AI classifier. However, by changing a few pixels in the scan (such that the differences are unlikely to be noticed by observers) and then inputting this altered image into the AI classifier, the classification may instead be output as 'lesion' (e.g. requiring lengthy and costly follow up or even an unnecessary surgical procedure).

Some embodiments can identify such adversarial attacks by, among other things, attempting to change the classification of a received image by making changes to the image which are unlikely to be noticed by a user when viewing the image. In other words, some embodiments can effectively perform a reverse adversarial attack to determine the likelihood that an image is the subject of an adversarial attack. Through this method, the system (or apparatus) or such embodiments can identify whether the received image is likely to be part of an adversarial attack, and flag it as suspicious (i.e. identify that it is a potential altered image).

One possible application of embodiments is to detect malicious alterations of original image such that subsequent AI analysis would be fooled to yield results advantageous to the forger. For instance, the forger may wish to alter CT images so that an AI decision support system would recommend further unnecessary exams, although analysis of original images would make no such erroneous recommendation.

Embodiments can provide a computer a non-transitory computer readable medium storing software comprising instructions executable by one or more computers which, upon such executions, causes the one or more computers to perform the method of embodiments.

Examples of computer-readable media include both volatile and non-volatile media, removable and non-removable media, and include, but are not limited to: solid state memories; removable disks; hard disk drives; magnetic media; and optical disks. In general, the computer-readable media include any type of medium suitable for storing, encoding, or carrying a series of instructions executable by one or more computers to perform any one or more of the processes and features described herein.

The apparatuses described above may be implemented on a single device or multiple devices in communication. More generally, it will be appreciated that the hardware used by embodiments can take a number of different forms. For example, the components of embodiments could be provided by a single device, or different components of could be provided on separate devices. More generally, it will be appreciated that embodiments can provide a system that comprises one device or several devices in communication.

Although some embodiments are described above in which the internet is used, this is not essential. Embodiments can be applied to an application shared between machines that communicate with each other, for example, over a network. Therefore, although the specific embodiment network uses the Internet, embodiments are applicable to any network whether it be a conventional landline network or a wireless network. More specifically, embodiments of the present invention are applicable to the Internet, an intranet, an extranet, a local area network, a wide area network or a network employing wireless application protocol.

Many further variations and modifications will suggest themselves to those versed in the art upon making reference to the foregoing illustrative embodiments, which are given by way of example only, and which are not intended to limit the scope of the invention, that being determined by the appended claims.

What is claimed is:

1. A system for identifying a potential altered image, the system comprising:
    an artificial intelligence, AI, model to process an image comprising a plurality of pixels each having a pixel value, the AI model having an input layer comprising a plurality of input weights, at least one intermediate layer comprising a plurality of intermediate weights, and an output layer to output a result, the AI model being operable in:
        a first mode in which the AI model is configured to process the image in a state in which the input weights and the intermediate weights are fixed, and provide a first output indicating whether the image shows a predetermined feature, and
        a second mode in which the AI model is configured to process the image and a target output different from the first output, in a state in which the AI model is permitted to adjust up to a predetermined threshold amount of the input weights to attempt to obtain the target output; and
    a processor to:
        control the AI model to operate in the first mode to obtain a first output,
        control the AI model to operate in the second mode to attempt to obtain the target output different from the first output,
        determine whether the AI model succeeded in obtaining the target output, and
        identify that the image is a potential altered image in response to determining that the AI model succeeded in obtaining the target output.

2. The system of claim 1, wherein the predetermined threshold amount corresponds to less than 1% of pixel values in the image.

3. The system of claim 1, wherein the AI model comprises an AI classifier.

4. The system of claim 1, wherein adjusting up to the predetermined threshold amount of the input weights comprises performing backpropagation on the input layer to adjust up to the predetermined threshold amount of weights, the backpropagation being based on the target output.

5. The system of claim 1, further comprising:
    a communication interface to receive the image; and
    an image storage to store a plurality of other images previously received by the system,
    wherein the processor is further configured to compare the image to the plurality of other images and to identify that the image is a potential altered image in response to determining that a similarity level between the image and one of the other images is above a threshold similarity level.

6. The system of claim 5, wherein the threshold similarity level is a predetermined percentage of pixels in the image and the one other image having equal pixel values.

7. The system of claim 5, wherein the threshold similarity level is higher than 95% of pixels in the image and the one other image having equal pixel values.

8. The system of claim 1, wherein the image is a medical scan and the processor is configured to segment the image into a plurality of tissue areas.

9. The system of claim 8, wherein the predetermined threshold amount corresponds to a predetermined percentage of pixels in a first tissue area from among the plurality of tissue areas.

10. The system of claim 8, wherein in the second mode, the AI model is operable to adjust the input weights in only one tissue area from among the plurality of tissue areas.

11. The system of claim 8, further comprising an expected pixel value storage configured to store expected pixel values for the plurality of tissue areas, and
    wherein the processor is configured to compare the pixel values in the plurality of tissue areas against the expected pixel values, and to identify that the image is a potential altered image in response to determining that the pixel values in the plurality of tissue areas do not correspond to the expected pixel values.

12. The system of claim 5, wherein the processor is configured to identify an external device as a suspicious device in response to determining that a predetermined threshold amount of potential altered images have been received from that device.

13. A computer-implemented method for identifying a potential altered image, the method comprising:
    operating an artificial intelligence, AI, model in a first mode to obtain a first output, wherein the AI model is configured to process an image comprising a plurality of pixels, each having a pixel value, the AI model having an input layer comprising a plurality of input weights, at least one intermediate layer comprising a plurality of intermediate weights, and an output layer to output a result, wherein the first mode is a mode in which the AI model is configured to process the image in a state in which the input weights and the intermediate weights are fixed, and provide the first output indicating whether the image shows a predetermined feature;
    operating the AI model in a second mode to attempt to obtain a target output different from the first output, wherein the second mode is a mode in which the AI model is configured to process the image and the target output different from the first output, in a state in which the AI model is permitted to adjust up to a predetermined threshold amount of the input weights to attempt to obtain the target output;
    determining whether the AI model succeeded in obtaining the target output; and
    identifying that the image is a potential altered image in response to determining that the AI model succeeded in obtaining the target output.

* * * * *